United States Patent [19]

Brekke

[11] 4,270,521
[45] Jun. 2, 1981

[54] SOLAR HEATING SYSTEM

[76] Inventor: Carroll E. Brekke, P.O. Box 1875, San Jose, Calif. 95109

[21] Appl. No.: 66,525

[22] Filed: Aug. 15, 1979

[51] Int. Cl.³ .............................................. F24J 3/02
[52] U.S. Cl. .................................. 126/433; 126/435; 165/104.22; 165/104.29
[58] Field of Search ............... 126/432, 433, 434, 450, 126/435; 165/105, 106

[56] References Cited

U.S. PATENT DOCUMENTS

| | | | |
|---|---|---|---|
| 2,230,917 | 2/1941 | Triana | 126/433 |
| 2,761,656 | 9/1956 | Spear | 165/62 |
| 3,951,204 | 2/1976 | Movick | 165/106 |
| 4,011,731 | 3/1977 | Meckler | 126/435 |
| 4,057,963 | 11/1977 | Basiulis | 126/433 |
| 4,061,131 | 12/1977 | Bohanon | 126/433 |
| 4,106,557 | 8/1978 | Sonobe et al. | 165/105 |
| 4,108,160 | 8/1978 | Harper | 126/435 |

*Primary Examiner*—James C. Yeung
*Attorney, Agent, or Firm*—Phillips, Moore, Weissenberger, Lempio & Majestic

[57] ABSTRACT

Solar heating systems which utilize the heat of the sun to obtain a continuous pumping action and which do not require constant or periodic care have not previously been available. Herein, percolating action is utilized, in conjunction with reduced pressure within the solar heating system, to provide the pumping function. The system can be utilized to transfer heat via heat exchanger to another fluid or can be utilized to heat swimming pools and the like. Briefly, the working fluid within the system is boiled at a pressure below atmospheric and the vapor is used to lift liquid from one level to another in the system through a lift tube.

22 Claims, 6 Drawing Figures

SOLAR HEATING SYSTEM

DESCRIPTION

1. Technical Field

This invention relates to a solar heating system for heating water for home and commercial hot water systems, recreational pools, and the like.

2. Background Art

The basic reason for utilizing a solar heating system is to minimize the use of other power sources, such as electricity, gas, or the like, while still obtaining the desired heating. In most solar heating systems, however, it is necessary to provide a pump, which is generally driven by electricity, for pumping liquid up from a water heat exchange system, a swimming pool or the like to a solar array on the roof of a house, or, in any event, somewhat above the fluid which is being heated. It is clear that this is wasteful and it would be desirable to provide a solar heating system which would operate fully and adequately without the necessity for a separately powered pump operating therein.

Some attempts have been made to utilize solar heat itself for pumping purposes in a solar heating system. For example, W. A. Harper in U.S. Pat. No. 4,108,160, issued Aug. 22, 1978 shows a thermosiphon type pump. The thermosiphon type pump of this reference intermittantly pumps liquid downwardly in the daytime and draws up the liquid at night. Thus, continuous up and down circulation does not occur and the solar collector and its support structure must be large enough and strong enough to hold substantially all of the liquid in the entire system. This creates a serious construction problem of reinforcing the roof of a building upon which the solar collector may be placed. Alternatively, the solar collector must be periodically covered or shaded for the system to continuously pump water or another working fluid. Therefore, this pumping system does not operate continuously without external control thereof. Such control can be so inconvenient as to require the user of the solar heating system to climb up on the roof of a house and periodically cover the solar collector. Thus, completely automatic continuous operation, during the daytime, is not attained unless some type of automatic shading system is designed and added. And operation of such a shading system would inherently require energy expenditures.

Solar heat has been used to lift liquid by means of pressure differentials controlled by float valves with the working liquid being vaporized by the suns heat. Such systems are shown in U.S. Pat. No. 2,230,917 issued Feb. 4, 1941 to P. G. Triana and in U.S. Pat. No. 4,061,131, issued Dec. 6, 1977 to H. R. Bohanan. However, in such systems it has been necessary to utilize a low boiling fluid as the heat transfer medium. Should any failure occur between the heat transfer system and the system to which heat is being transferred, potentially dangerous leakage can occur. Further, such systems are clearly not useful wherein the heat transfer liquid itself is discharged into a recreational pool such as a swimming pool and is also lifted therefrom to the solar collector.

While the percolator pumping system is well-known for extracting flavor from coffee beans, and has been used in air conditioning units with the use of external water for cooling the condenser, as disclosed, for example, in U.S. Pat. No. 2,761,656 issued Sept. 4, 1956 to R. K. Spear, such a system has not been adapted to solar heating, particularly since the solar collector portion of a solar heating system is generally well above the fluid being heated thereby, and it is not readily apparent that such a percolator system can be practically adapted for use with a solar heating system.

It would be advantageous to provide a percolator pumping system as part of a solar heating system, wherein the solar heating system would not require an externally powered pump, could operate with relatively nonvolatile fluids such as water as a working fluid, could operate continuously during daytime, and did not require periodic attention such as covering or uncovering of the solar collector panel.

DISCLOSURE OF INVENTION

The present invention is directed to overcoming one or more of the problems of the prior art as set out above.

In one aspect of the present invention, an improvement is provided in a liquid containing solar heating system which has a solar heat collector, a heat exchanger which extracts heat from the liquid, means for conducting the liquid from the collector, after it has been heated therein, to the heat exchanger, and liquid returning means for returning liquid from the exchanger, after it has been cooled therein, to the collector. The improvement comprises pressure maintaining means for maintaining the collector at a pressure below atmospheric such that the liquid therein boils and produces a vapor at a temperature below the boiling temperature of that liquid at atmospheric pressure. A conduit connects a lower level in the system to a higher level therein. A lift tube is provided in liquid flow communication with the conduit. Means are provided for bubbling the vapor upwardly through the tube for producing a force for lifting the cooled liquid from the exchanger to an elevation above the collector. Condenser means above the collector serve for receiving the cooled liquid and condensing the vapor. Means are also provided for conducting the liquid from the condenser means to the collector.

In another aspect of the present invention, a solar heating system is provided for heating a liquid filled pool such as a swimming pool. The system comprises a solar heat collector having the liquid therein. Means are provided for conducting the liquid from the collector to below a surface of the pool. Means are also provided for returning the liquid from below the surface of the pool to the collector. Means are provided for maintaining the collector at a pressure below atmospheric such that the liquid in the collector boils and produces a vapor at a temperature below the boiling temperature of the liquid at atmospheric pressure. A conduit goes from a lower level to a higher level in the system. A lift tube is provided in liquid flow communication with the conduit. Means are provided for bubbling the vapor from the collector upwardly through the tube for producing a force for lifting the cooled liquid from the pool to an elevation above the collector. Condenser means are above the collector and serve for receiving the cooled liquid and condensing the vapor. Means are provided for conducting the liquid from the condenser means to the collector.

The above set out embodiments provide a solar heating system which may be connected to heat a hot water system or a swimming pool in its different embodiments. The system does not require the use of a separately powered pump, but instead makes use only of solar energy. The system also does not require constant adjustment as by covering the collector, or by carefully selecting the location of the collector. Further, the system can utilize, for example, water, as the working liquid rather than more volatile, and at times dangerous, low boiling liquids. Since water can be utilized as the working liquid, it is clear that an open system can be utilized wherein the water from the solar collector passes directly into a swimming pool or the like and wherein the swimming pool water is pumped into the system and forms a part of the circulating loop.

BRIEF DESCRIPTION OF DRAWING

The invention will be better understood by reference to the figures of the drawings wherein like numbers denote like parts throughout; and wherein.

BEST MODE FOR CARRYING OUT THE INVENTION

Figure 1A:
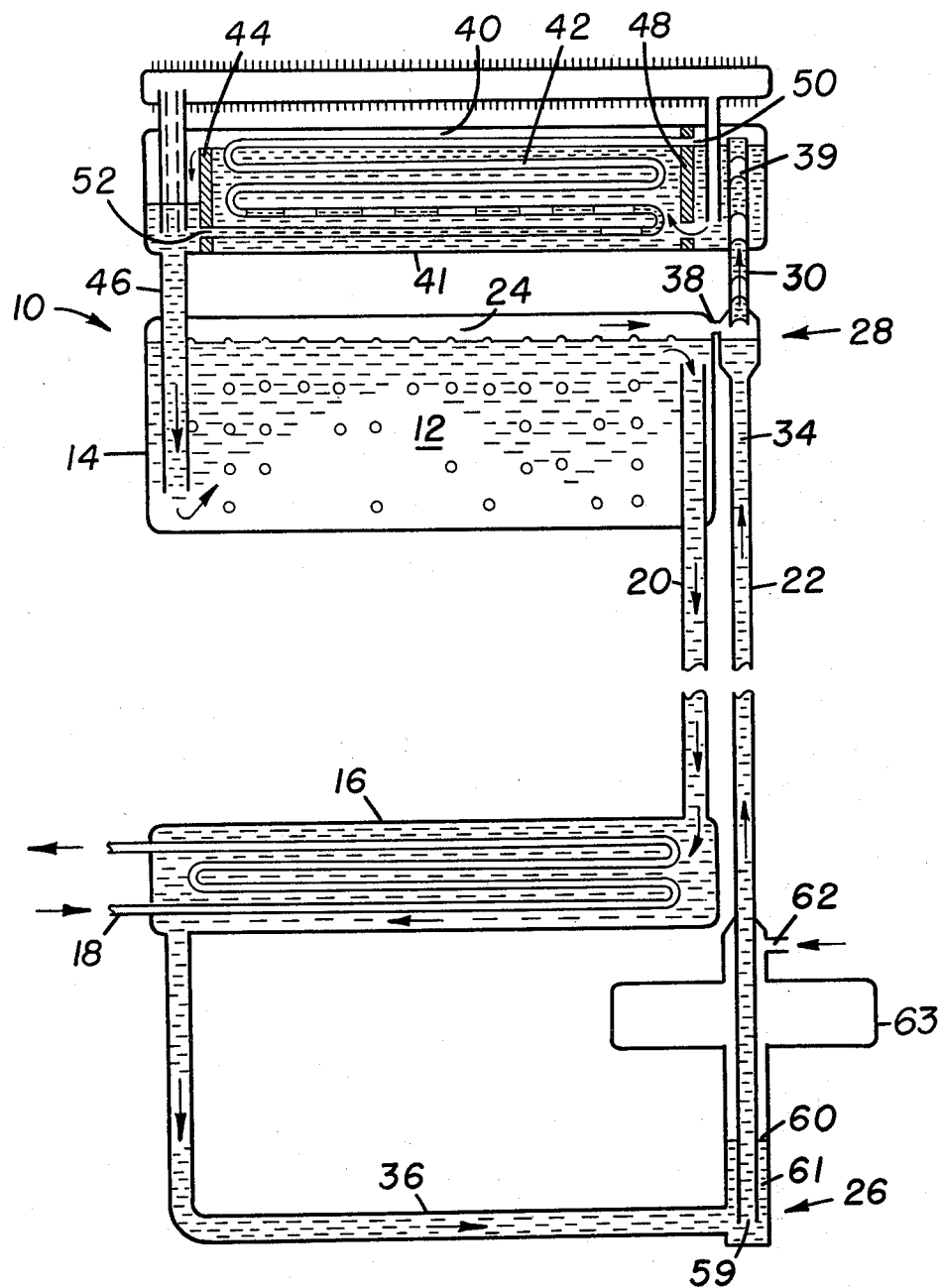
FIGS. 1A and 1B illustrate, in schematic view in two different stages of operation, an embodiment in accordance with the present invention.

Adverting to FIG. 1A, there is illustrated therein a solar heating system 10 having a working liquid 12 therein. The solar heating system 10 includes a solar heat collector 14 and a heat exchanger 16. A fluid is flowed, as indicated by arrows, through piping 18 within heat exchanger 16 wherein heat is transferred from the liquid 12 to the fluid in the piping 18. In one embodiment the heat exchanger 16 can be tubing within a recreational pool. Means, in the embodiment of FIG. 1A a first conduit 20, serves for conducting the liquid 12 from the collector 14, after it has been heated therein, to the heat exchanger 16. Means, in the embodiment illustrated a second conduit 22, serves for returning the liquid from the heat exchanger 16, after it has been cooled therein, to the heat collector 14.

In accordance with the present invention, pressure maintaining means are provided for maintaining the collector 14 at a pressure below atmospheric pressure, such that the liquid 12 therein boils therein and produces a vapor 24 at a temperature below the boiling temperature of the liquid 12 at atmospheric pressure.

Figure 1B:
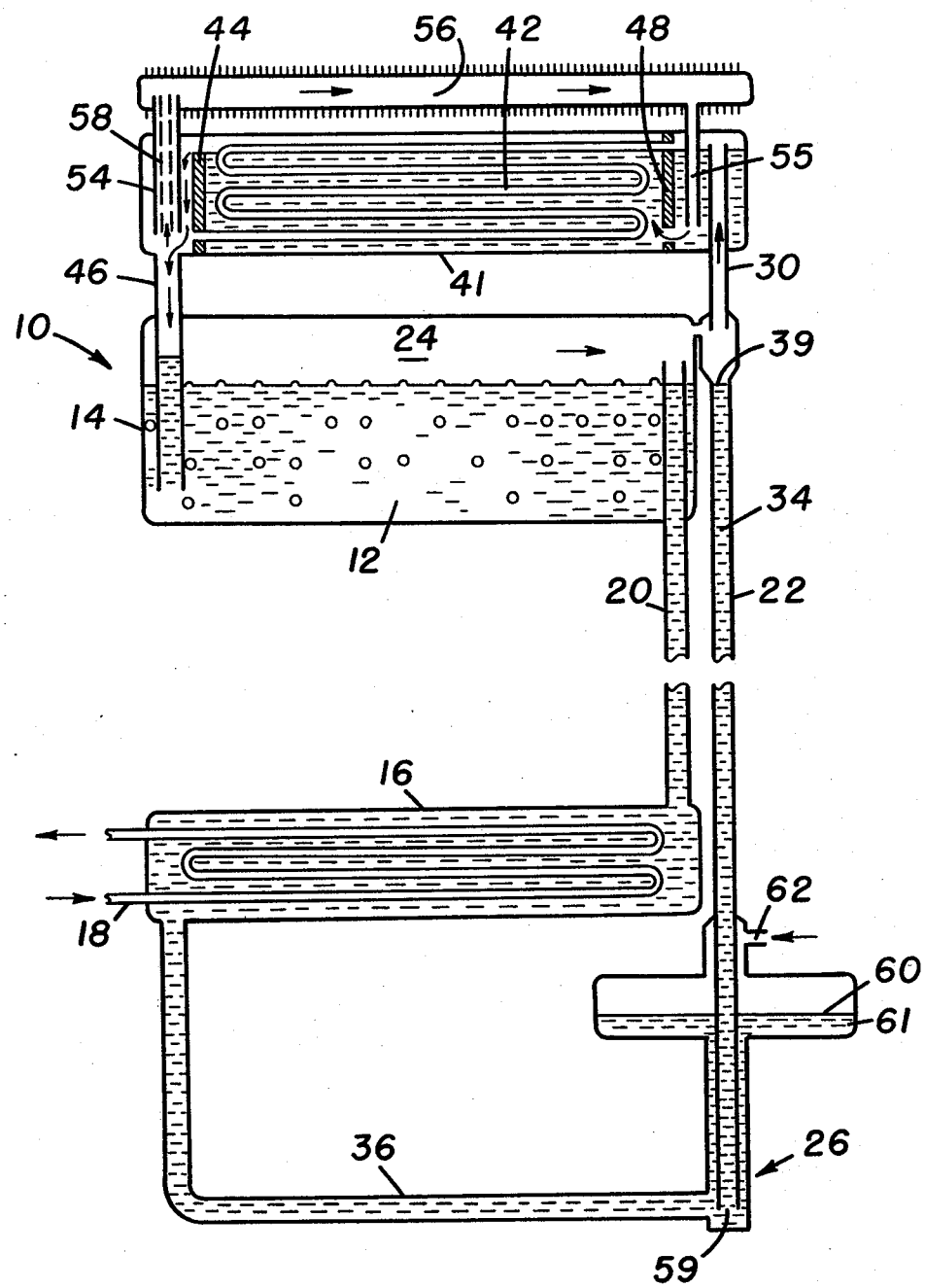

In the embodiment of FIGS. 1A and 1B, the second conduit 22 proceeds from a lower level 26 to a higher level 28 in the system 10. A lift tube 30 is positioned in liquid flow communication with a column of liquid 34 within the second conduit 22 and thereby effectively serves as a continuation of the column 34. Means are provided for bubbling the vapor 24 upwardly through the lift tube 30 for producing a force for lifting the cooled liquid 12 from the heat exchanger 16 via a recycling conduit 36 to an elevation above the heat collector 14. As illustrated, the bubbling means includes a passage 38 from the heat collector 14 to a top end 39 of the continuation of the column 34. Percolating action is therefore provided since the liquid 12 is boiling within the heat collector 14. The top end 39 of the column 34 is in gas flow communication, via a top portion 40 of a condenser 41, with the heat collector 14.

Above the heat collector 14, the condenser 41 is arranged for receiving the cooled liquid 12 which passes upwardly through the liquid column 34 and for condensing the vapor 24 by requiring it to pass through appropriate condenser tubing 42 which is below the surface of the liquid 12 within the condenser 41. A dam 44 serves to retain sufficient of the liquid 12 in the condenser 41 so as to properly cover sufficient of the tubing 42 to accomplish the condensing function on the vapor 24. A conduit 46 serves as a means for conducting the liquid 12, after it has passed over the dam 44, to the heat collector 14. It will be noted that the condenser 41 includes a reservoir 48 which is connected to receive the cooled liquid 12 which exits the lift tube 30. The heat exchange tubing or piping 42 is within the reservoir 48 and is connected to receive the vapor 24 which exits the lift tube 30 via an entrance 50 of the tubing 42. The condensate within the heat exchange tubing 42 is delivered via an exit therefrom 52 to the solar heat collector 14 via the conduit 46 as illustrated. It should further be noted that the dam 44 serves as means for preventing the cooled liquid 12 from being conducted by the conduit 46 from the reservoir 48 to the solar heat collector 14 unless at least a selected amount of the cooled liquid 12, namely enough to go over the dam 44, is in the reservoir 48.

FIG. 1A shows the position of the liquid 12 when percolation is occurring up the lift tube 30. FIG. 1B indicates the situation which exists when the fluid passing through the piping 18 in the heat exchanger 16 has been heated to its desired temperature. In such an instance, heat is not sufficiently dissipated into the fluid flowing through the piping 18. As a result, pressure is built up within the condenser 41 whereby a tube 54 is opened to expose an overload cooling chamber 56 to receive the vapor 24. In the overload cooling chamber 56, the vapor 24 is cooled sufficiently to condense it whereupon it flows downwardly through an end tube 55 and then passes via the reservoir 48, over the dam 44 and through the conduit 46 and into the collector 14. A perforate tubular member 58 is positioned within tube 54 to prevent flow stoppage. Excess heat is thereby automatically dissipated.

A lower end 59 of the second conduit 22 is beneath a surface 60 of a pool 61 of the liquid 12 and the surface 60 is exposed to the atmosphere as via a passage 62. A bulge 63 serves for accepting the liquid 12 in the FIG. 1B overheating condition. The pressure exerted on the surface 60 is atmospheric pressure, whereas, the pressure exerted at the top 39 of the column 34 is atmospheric pressure minus a pressure due to the column 34. Thus, a reduced pressure is provided within the system 10. This reduced pressure allows the liquid 12 to be boiled at a temperature below the temperature at which it would normally boil at atmospheric pressure. Generally, the length of the column 34 is adjusted to be about 22.5 feet if the liquid 12 is water. The water then boils at about 3.7 psia, corresponding to about 150° F. (65° C.). As the height of column 34 decreases during operation, the boiling temperature increases providing a self-adjusting feature. Pumping rate likewise automatically adjusts dependent on the differential temperature between piping 18 and collector 14. External controls are, thus, unnecessary. The fluid passing through the tubing 18 is heated to about the reduced pressure boiling temperature. The top end 39 of the column 34 of within the second conduit 22 is in communication with the solar heat collector 14 via the condensor 41 and thus maintains a lowered pressure therein in the manner just disclosed.

EMBODIMENT OF FIG. 2

Figure 2:
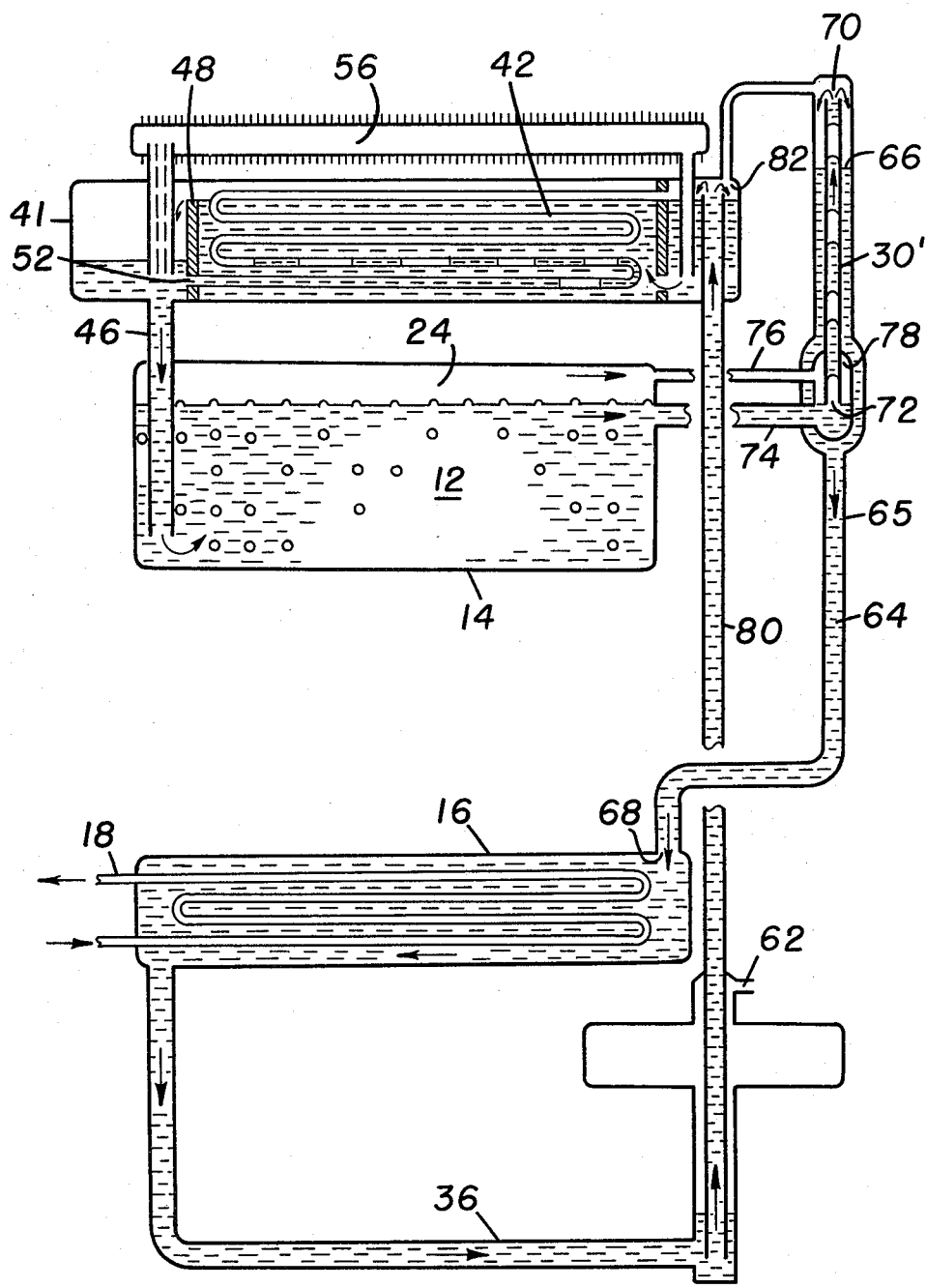
FIG. 2 illustrates, in similar view to FIG. 1A, a second embodiment in accordance with the present inventions.

Adverting now to FIG. 2, there is shown therein an improvement in accordance with the present invention wherein a column 64 of the liquid 12 is located within a conduit 65 and extends from above the solar heat collector 14, particularly from a top surface 66 thereof, downwardly to the heat exchanger 16 at a lower end 68 of the column 64. In this embodiment, a top end 70 of a lift tube 30' is in liquid flow communication with the top end 66 of the column 64 in the conduit 65. In particular, as liquid 12 flows out of the top end 70 of the lift tube 30', it falls downwardly and becomes a part of the column 64.

Meanwhile, a bottom end 72 of the lift tube 30' is in liquid flow communication with the solar heat collector 14 via a passage 74. Vapor 24, which is produced by boiling within the solar heat collector 14, passes via a passage 76 into a small chamber 78, wherein it percolates the liquid 12 which passes through the passage 74 upwardly through the lift tube 30'. In this embodiment, it is clear that warm liquid 12 is percolated upwardly through the lift tube 30'. As a result this creates flow as shown by the downwardly pointing arrow in the column 64. This flow causes warm liquid to flow into the heat exchanger 16 wherein the piping 18, and thereby the fluid therein, is heated. Because of this percolation, flow proceeds downwardly via recycling conduit 36 and therefrom upwardly through a conduit 80 and thence into a right hand chamber 82 in the condensor 41. From the right hand chamber 82 the liquid flows leftwardly into the reservoir 48 while the vapor flows through the tubing 42 and is condensed as in the embodiment of FIG. 1A. The other portions of the embodiment of FIG. 2 work in substantially the same manner as the embodiment of FIG. 1A.

EMBODIMENT OF FIG. 3

Figure 3:
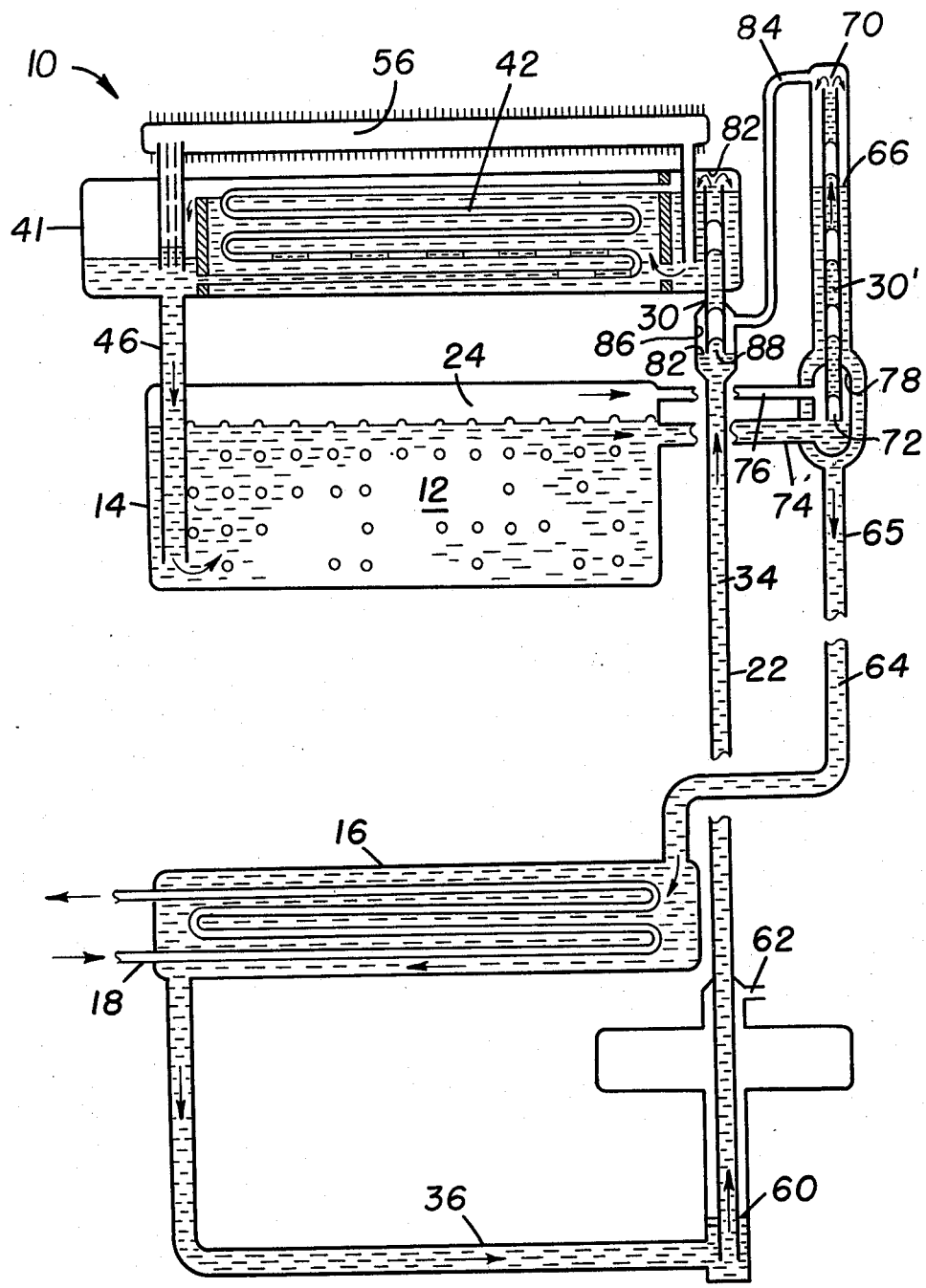
FIG. 3 illustrates, in similar view to FIG. 1A, a third embodiment in accordance with the present invention.

Referring next to FIG. 3 it will be seen that the structure shown therein illustrates a preferred embodiment which makes use of two lift tubes, which correspond generally to the lift tubes 30 and 30' of FIGS. 1A and 2, respectively. Referring particularly to the differences from the embodiment of FIG. 2, it will be noted that the lift tube 30' impels warm liquid 12 upwardly therein to the top surface 66 of the liquid column 64. The embodiment of FIG. 3 differs from that of FIG. 2 in that the vapor 24 which exits the lift tube 30' proceeds via a passage 84 to a small chamber 86 atop the liquid column 34. In the small chamber 86, the liquid column 34 reaches to a bottom end 88 of the lift tube 30. The vapor 24 passing through the passage 84 then serves to lift the liquid 12 from an intermediate position at the top of the conduit 22 of the liquid column 34, and to deliver it to the right hand chamber 82 of the condensor 41. In this manner, a double pumping action is attained with both the lift tube 30' and the lift tube 30 providing lift and with the vapor 24 being passed sequentially through the lift tubes 30' and 30.

EMBODIMENT OF FIG. 4

Figure 4:
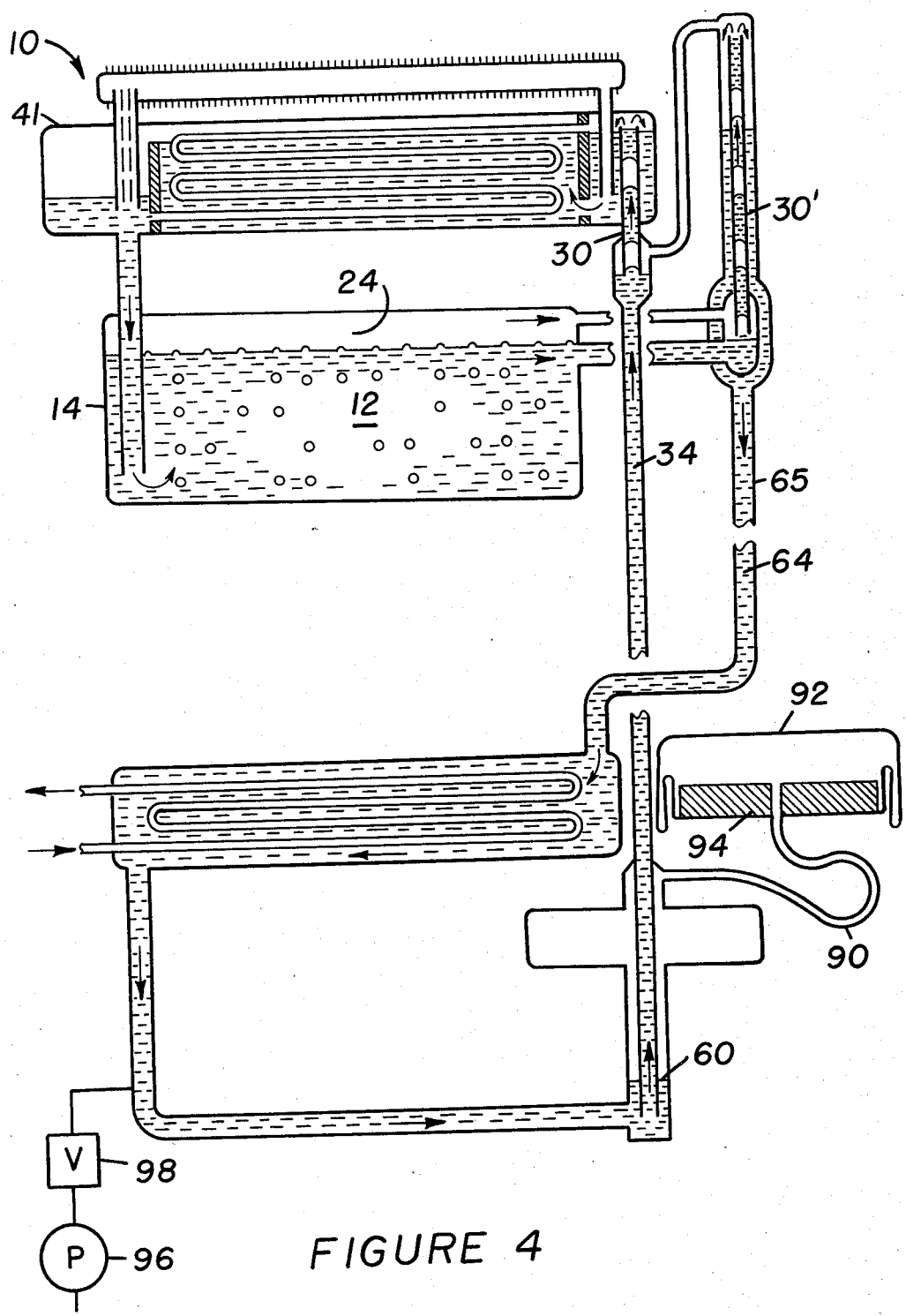
FIG. 4 illustrates, in similar view to FIG. 1A, a fourth embodiment in accordance with the present invention.

FIG. 4 illustrates an embodiment which is very similar to that of FIG. 3 in that, as in FIG. 3, the two lift tubes 30' and 30 are utilized and in the same manner. The difference between the embodiment of FIG. 3 and that of FIG. 4 lies in the particular means utilized for maintaining pressure in the collector 14 at the selected pressure below atmospheric pressure. In the embodiment of FIG. 3, this pressure is maintained by having atmospheric pressure acting upon the surface 60 and by having sufficient length in the column 34 and in the column 68 so that a reduced pressure results at the top ends thereof. In FIG. 4, on the other hand, the columns 34 and 64 can be as short as desired. Thus, a much more compact system 10 is provided. This is accomplished by adding certain structures as will shortly be described.

The first structure added is a connecting line 90 leading to an accumulator 92 of conventional construction. Biasing means, such as weights 94, is added to the accumulator 92 and serves to bias the accumulator 92 to be normally expanded. The solar heating system 10 is initially fully filled with the liquid 12. Thereafter, a pump 96 is actuated and some of the liquid 12 is pumped out of the system 10 past a valve 98. Sufficient liquid 12 is removed so as to provide a partial vacuum in collector 14. Also, pumping out of the fluid 12 via the pump 96 collapses the biased-expanded accumulator 92. Alternatively, weights 94 can be pushed during filling, the collector 14 can be heated to 100° C., and some liquid 12 can be bled off at valve 98, thus removing the necessity for pump 96. A system 10 is created which does not require, for example, 22.5 feet of liquid 12 in the columns 34 and 64. Further, the system 10 is now closed, i.e., it is not open to the atmosphere at surface 60, whereby the liquid 12 can be of any desired composition, e.g., can be ethylene glycol or the like. This is possible since the liquid 12 cannot evaporate at the surface 60. In all other manners, the embodiment of FIG. 4 operates identically to that of FIG. 3.

EMBODIMENT OF FIG. 5

Figure 5:
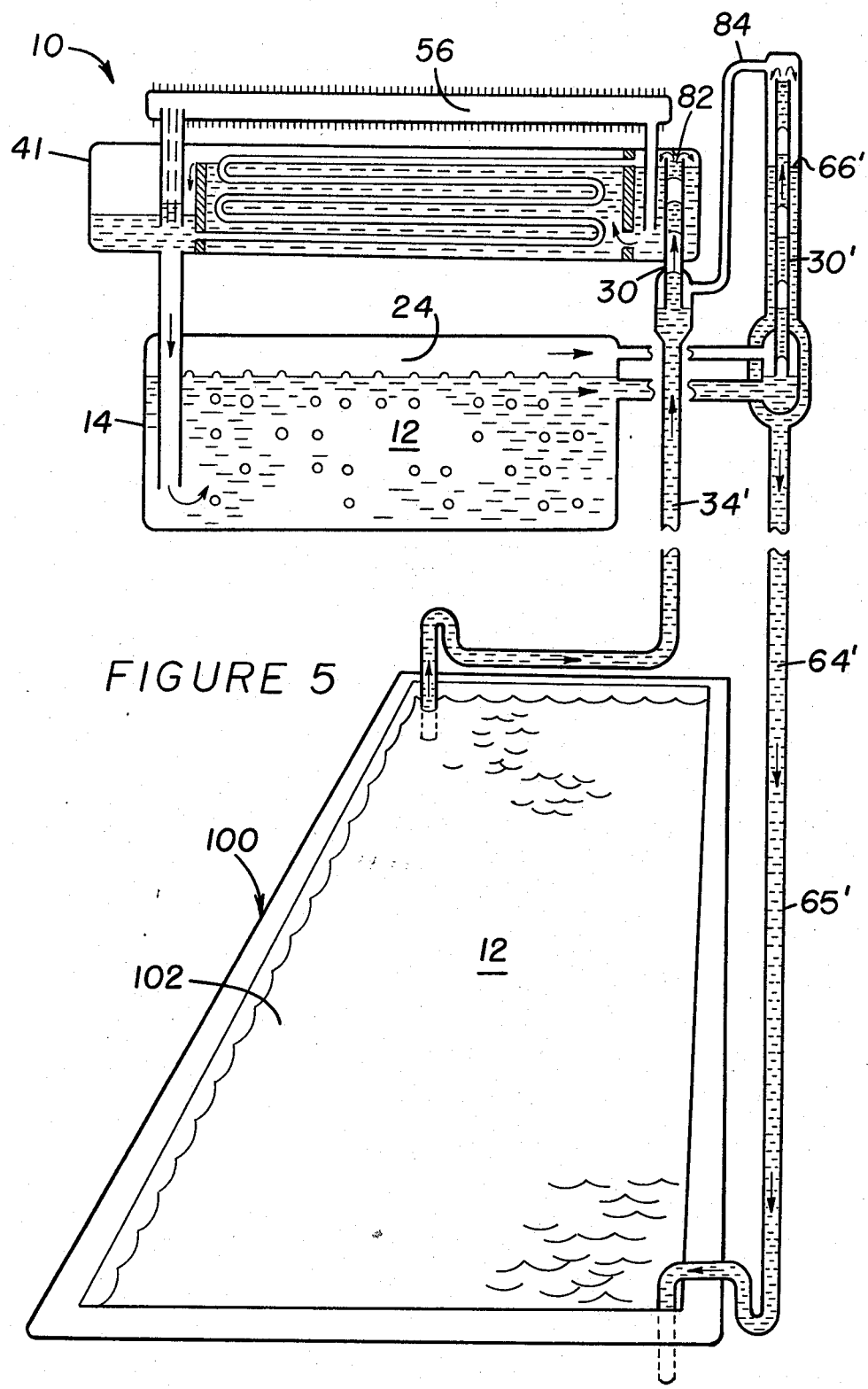
FIG. 5 illustrates, partially in similar view to FIG. 1A, and partially perspectively, a fifth embodiment in accordance with the present invention.

FIG. 5 illustrates an embodiment wherein a classical heat exchanger is not part of the system, but wherein instead the liquid 12 in the system circulates through a liquid filled pool 100, which, in a sense, serves as a heat exchanger as well as an exchanger of the liquid 12. The pumping action is identical to that of the embodiment of FIG. 3. A lift tube 30' lifts warm liquid 12 from the solar heat collector 14 to a top end 66' of a liquid column 64'. Flow then occurs downwardly through a conduit 65' and enters the pool 100 below a surface 102 of the liquid 12 therein. A lift tube 30 lifts cold water from a different and removed position in the pool 100, via a column 34' to the condensor 41. Thus, double pumping action is attained.

While it is contemplated that the length of the columns 34' and 64' will normally be approximately 22.5' so that the liquid 12 will boil at about 150° F., it should be noted that the columns 34' and 64' can conceivably be made long enough to reduce the boiling temperature of the liquid 12 to precisely the temperature desired for the liquid 12 when it is in the pool 100. For example, the columns 34' and 64' can be made long enough to provide a temperature for the liquid 12 of 90° F. This will then serve as the limit or upper temperature which the pool 100 can attain. It is of course clear that the liquid 12 would be water in such an embodiment.

It should also be noted that while the two lift tubes 30' and 30 are shown as being utilized in the FIG. 5 embodiment, only one of these is absolutely necessary, although, of course, the pumping efficiency will be reduced if only one of the lift tubes 30' and 30 is utilized.

INDUSTRIAL APPLICABILITY

The invention is particularly useful for providing a solar heating system 10 for use in homes to provide hot water therefor through heat exchange to a hot water system, and for use in heating swimming pools or other recreational pools. The solar heating system 10 as disclosed herein is particularly advantageous in that it requires no external power to provide the pumping action and in that the working fluid can be nontoxic, preferably simply pure water, thus eliminating any possible problems which might be created by leakage developing between the solar heating system 10 and the fluid heated thereby, generally also water. The solar heating system 10 is self adjusting and it is not necessary to cover or uncover any parts of it to control its proper operation. Cycling of the liquid in the system is continuous rather than intermittant. Further, the solar heating system 10 can be made quite compact, particularly the embodiment illustrated in FIG. 4.

Other aspects, objectives, and advantages of this invention can be obtained from a study of the drawings, the disclosure and the appended claims.

I claim:

1. A liquid containing a solar heating system having a higher level having a solar heat collector and a lower level having a heat exchanger below said collector, said system having a liquid therein, said exchanger extracting heat from said liquid and thereby forming a cooled liquid, an improvement comprising:
   pressure maintaining means for maintaining said collector at a pressure such that said liquid therein boils and produces a vapor at a temperature below the boiling temperature of water at atmospheric pressure;
   a conduit having a top portion and a bottom portion and communicating said lower level in said system with said higher level in said system, said conduit having a column of said liquid therein;
   a lift tube in liquid flow communication with said top portion of said conduit;
   means for bubbling said vapor upwardly through said lift tube in response to solar heating of said solar heat collector for producing a force for lifting said cooled liquid from said heat exchanger to an elevation above said collector;
   condenser means for receiving said cooled liquid after it has been lifted by said force and for condensing said vapor; and
   conducting means for conducting said liquid from said condenser means to said collector.

2. An improvement as in claim 1, wherein said column is of a sufficient height to provide said collector pressure at a top end thereof and wherein a bottom end of said column is below a surface of said liquid, said surface being at a selected pressure, and wherein said pressure maintaining means communicates said top end of said column with said collector.

3. An improvement as in claim 2, wherein said top end of said column communicates with said collector via said condenser means.

4. An improvement as in claim 3, further including:
   overload cooling means for receiving said vapor if it is not condensed in said heat exchange tubing and for cooling said vapor sufficiently to condense it; and
   means for delivering vapor condensed by said overload cooling means to said collector; wherein said surface is in a vessel of sufficient volume to retain said liquid when said overhead cooling means is operating.

5. An improvement as in claim 1, wherein said conduit is from above said collector to said exchanger, and wherein a top end of said lift tube is in liquid flow communication with a top end of said column, and a bottom end of said lift tube is in liquid flow communication with said collector.

6. An improvement as in claim 2, further including:
   an auxiliary conduit from above said collector to said heat exchanger and having an auxiliary column of liquid therein;
   an auxiliary lift tube having a top end thereof in liquid flow communication with a top end of said auxiliary column and a bottom end thereof in liquid flow communication with said collector; and
   means for bubbling said vapor upwardly through said auxiliary tube for lifting said liquid from said collector to said top end of said auxiliary column.

7. An improvement as in claim 1, wherein said condenser means includes a reservoir connected to receive said cooled liquid, heat exchange tubing in said reservoir connected to receive said vapor from said lift tube and to condense said vapor and to deliver the condensate thus obtained to said collector, and means for preventing said cooled liquid from being conducted, by said conducting means, from said reservoir to said collector unless at least a selected amount of said cooled liquid is in said reservoir.

8. An improvement as in claim 7, further including:
   overload cooling means for receiving said vapor if it is not condensed in said heat exchange tubing and for cooling said vapor sufficiently to condense it; and
   means for delivering vapor condensed by said overload cooling means to said collector.

9. An improvement as in claim 1, wherein said bubbling means includes means for conducting said vapor from said collector to a bottom end of said lift tube.

10. An improvement as in claim 6, wherein said bubbling means includes means for conducting vapor from said collector to a bottom end of said auxiliary lift tube and means for conducting vapor from a top end of said auxiliary lift tube to a bottom end of said lift tube.

11. An improvement as in claim 1, wherein said pressure maintaining means includes means for creating a void space in said system following initial complete filling thereof to provide said collector pressure at a top end of said column and wherein a bottom end of said column is below a surface of said liquid in a vessel, said vessel being at a selected pressure, and wherein said pressure maintaining means communicates said top end of said column with said collector.

12. An improvement as in claim 11, wherein said pressure maintaining means includes means for enclosing said vessel; an accumulator communicating with said vessel above said surface; and means for biasing said accumulator to be normally expanded.

13. A solar heating system having a higher level and a lower level, the system serving for heating a liquid containing vessel having a liquid therein, comprising:
   a solar heat collector having said liquid therein;
   means for conducting said liquid from said collector to below a surface of the liquid in said vessel;

liquid returning means for returning said liquid from a height below said surface of the liquid in said vessel to said collector;

means for maintaining said collector at a pressure such that said liquid in said collector boils and produces a vapor at a temperature below the boiling temperature of water at atmospheric pressure;

a conduit having a top portion and a bottom portion and communicating said lower level in said system with said higher level in said system, said conduit having a column of said liquid therein;

a lift tube in liquid flow communication with said top portion of said conduit;

means for bubbling said vapor from said collector upwardly through said lift tube in response to solar heating of said solar heat collector for producing a force for lifting said cooled liquid from said vessel to above said collector;

condenser means above said collector for receiving said cooled liquid after it has been lifted by said force and for condensing said vapor; and conducting means for conducting said liquid from said condenser means to said collector.

14. A system as in claim 13, wherein said boiling temperature in said collector is substantially a maximum desired temperature for said vessel.

15. A system as in claim 13, wherein said column is of a sufficient height to provide said collector pressure at a top end thereof, and wherein said pressure maintaining means communicates said top end of said column with said collector.

16. A system as in claim 15, wherein said top end of said column communicates with said collector via said condenser means.

17. A system as in claim 15, further including:
an auxiliary conduit from above said collector to below said surface of said liquid in said vessel, and wherein said conducting means is a column of liquid in said auxiliary conduit;

an auxiliary lift tube having a top end thereof in liquid flow communication with a top end of said auxiliary column and a bottom end thereof in liquid flow communication with said collector; and means for bubbling said vapor upwardly through said auxiliary lift tube for lifting said liquid from said collector to said top end of auxiliary column.

18. A system as in claim 17, wherein said bubbling means includes means for conducting said vapor from said collector to a bottom end of said auxiliary lift tube and means for conducting said vapor from a top end of said auxiliary lift tube to a bottom end of said lift tube.

19. A system as in claim 18, wherein said condenser means includes a reservoir connected to receive said cooled liquid, heat exchange tubing in said reservoir connected to receive said vapor from said tube and condense said vapor and connected to deliver the condensate thus obtained to said collector, and means for preventing said cooled liquid from being conducted by said conducting means, from said reservoir to said collector, unless at least a selected amount of said cooled liquid is in said reservoir.

20. A system as in claim 19, further including:
overload cooling means for receiving said vapor if it is not condensed in said heat exchange tubing and for cooling said vapor sufficiently to condense it; and means for delivering said vapor condensed by said overload cooling means to said collector.

21. A system as in claim 13, wherein said conduit is from above said collector to below said surface of said liquid in said vessel, wherein a top end of said lift tube is in liquid flow communication with a top end of said column, and wherein a bottom end of said lift tube is in liquid flow communication with said collector.

22. A system as in claim 13, wherein said vessel is an open pool.

* * * * *